(12) United States Patent
He et al.

(10) Patent No.: US 7,369,551 B2
(45) Date of Patent: May 6, 2008

(54) SYSTEM AND METHOD OF ACCESSING AND TRANSMITTING DIFFERENT DATA FRAMES IN A DIGITAL TRANSMISSION NETWORK

(75) Inventors: Zhiqun He, Shenzhen (CN); Yuxiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 10/765,283

(22) Filed: Jan. 28, 2004

(65) Prior Publication Data

US 2004/0258080 A1    Dec. 23, 2004

(30) Foreign Application Priority Data

Jan. 28, 2003    (CN)    ................ 03 1 03092

(51) Int. Cl.
 H04L 12/28    (2006.01)
 H04J 3/16    (2006.01)
 G06F 15/173    (2006.01)
(52) U.S. Cl. .................. 370/389; 370/401; 370/466; 709/238; 709/246
(58) Field of Classification Search ........ 370/232–253, 370/389–401, 419–463; 709/238–246, 249–250
See application file for complete search history.

(56) References Cited

U.S. PATENT DOCUMENTS

| 5,251,207 | A |  | 10/1993 | Abensour et al. |  |
|---|---|---|---|---|---|
| 5,949,757 | A | * | 9/1999 | Katoh et al. ................. | 370/232 |
| 6,993,023 | B2 | * | 1/2006 | Foster et al. ................ | 370/389 |
| 7,016,979 | B2 | * | 3/2006 | He et al. ..................... | 709/246 |
| 7,047,313 | B1 | * | 5/2006 | Broerman .................... | 709/238 |
| 2002/0086705 | A1 |  | 7/2002 | Yokoyama |  |
| 2002/0176450 | A1 |  | 11/2002 | Kong et al. |  |
| 2002/0181486 | A1 |  | 12/2002 | Cantwell |  |
| 2003/0142680 | A1 | * | 7/2003 | Oguchi ....................... | 370/400 |
| 2004/0037279 | A1 | * | 2/2004 | Zelig et al. ................. | 370/390 |
| 2004/0100962 | A1 | * | 5/2004 | Kim et al. ................... | 370/392 |
| 2004/0223501 | A1 | * | 11/2004 | Mackiewich et al. ....... | 370/401 |

FOREIGN PATENT DOCUMENTS

| EP |  | 0 982 900 A2 | 3/2000 |
| WO |  | WO 02/17542 A2 | 2/2002 |
| WO |  | WO 02/17542 A3 | 2/2002 |

* cited by examiner

Primary Examiner—Man U. Phan
(74) Attorney, Agent, or Firm—McDermott Will & Emery LLP

(57) ABSTRACT

A system accessing and transmitting data frames includes: at least one subscriber network interface, and/or at least one inter-network interface, and a data converting device coupled with the subscriber network interface and the inter-network interface. The data converting device includes: a virtual private device, an interface device, and a processing device. The virtual private device is configured for exchanging data frames between the subscriber network interface and the inter-network interface via interface device. The virtual private device includes an inter-device interface, coupled with the processing device; a virtual private processing unit, coupled with the inter-device interface and adapted for detecting control messages and converging or diverging data frames; a rule database, coupled with the virtual private processing unit and adapted for storing rules, according to which data frames are processed; and a control interface unit, coupled with and adapted for controlling the rule database and the virtual private processing unit.

11 Claims, 11 Drawing Sheets

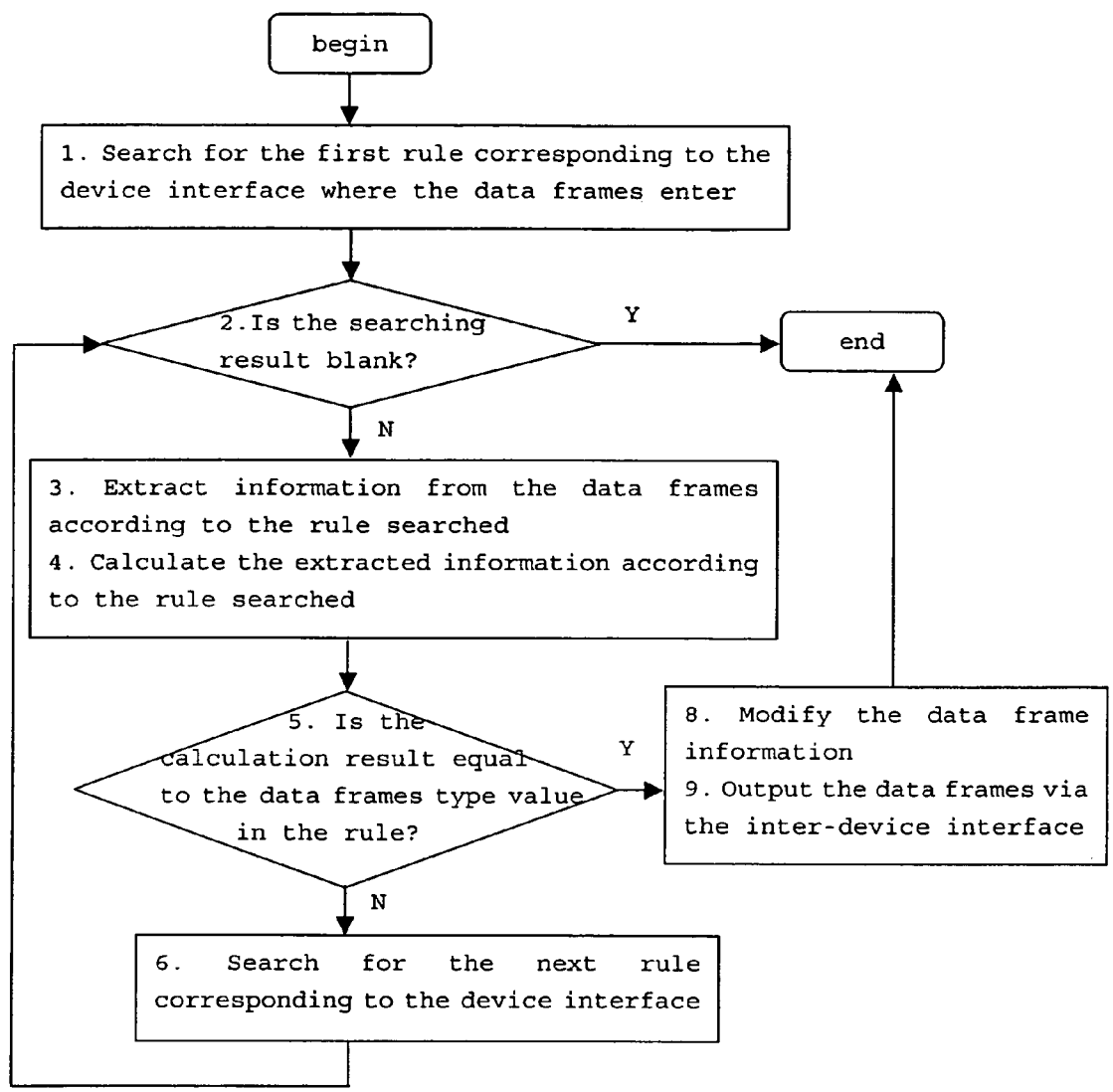
Fig.4A(F1)

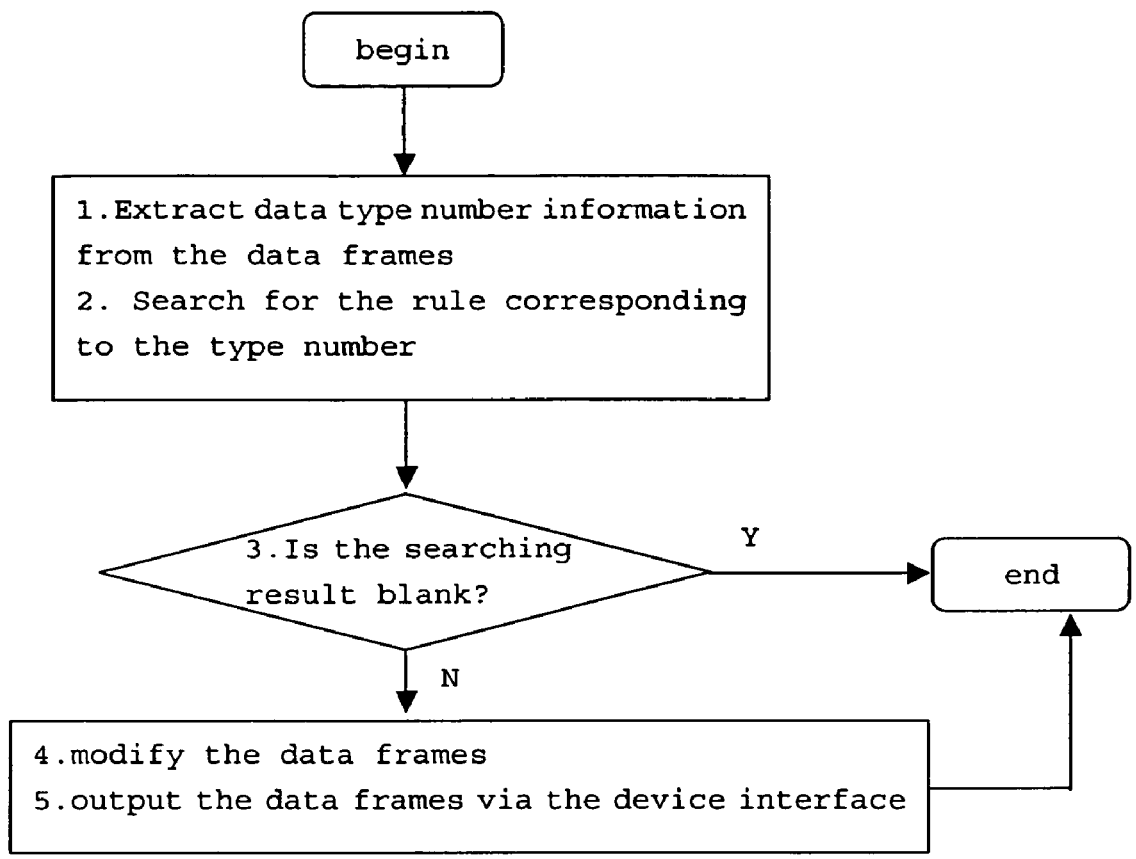
Fig.4A(F2)

SYSTEM AND METHOD OF ACCESSING AND TRANSMITTING DIFFERENT DATA FRAMES IN A DIGITAL TRANSMISSION NETWORK

FIELD OF THE INVENTION

The present invention relates to a system and method of accessing and transmitting data frames, in particular to a system and method of accessing and transmitting different data frames in a digital transmission network.

BACKGROUND OF THE INVENTION

Because Ethernet technology features low price and high expansibility, etc., it has evolved from a mainstream LAN technology to a primary data service access technology and is widely used in Metropolitan Area Network (MAN) by more and more telecom operators. Providing of Ethernet data services has becoming a trend for telecom operators. Ethernet data services can be classified into two types: Ethernet private line services and Virtual Local Area Network (VLAN) services.

For convenience, the phrases and abbreviations in the following description have the following meanings: MPLS—Multi-protocol Label Switching; GFP—General Frame Positioning; VLAN—virtual Local Area Network; VMAN—virtual Metropolitan Area Network; RPR—Resilient Packet Ring.

Currently, most of the telecom operators' data transmission networks are SDH/SONET networks. Therefore, it is a highlight for telecom operators and telecom equipment manufacturers to access and transfer Ethernet data frames effectively in a SDH/SONET network to meet the increasing demand for Ethernet data services. At present, several telecom equipment manufacturers have provided devices to access and transfer Ethernet data frames in an SDH/SONET network, and those devices may be classified into 3 types according to the implementation approach of functionality:

(1) Data mapping/demapping scheme;
(2) Bridge scheme;
(3) RPR scheme.

FIG. 1 shows a block diagram of an apparatus according to the data mapping/demapping scheme in the first prior art. The apparatus includes one or more subscriber network interfaces 20 (standard Ethernet interfaces), one or more inter-network interfaces 30 (synchronous digital transmission channels), one or more mapping/demapping devices 101, 102, . . . , each of which corresponds to a unique subscriber network interface and a unique inter-network interface. Wherein, data frames entering the apparatus via the one or more subscriber network interfaces 20 and data frames output from the apparatus comply with Ethernet data standard; data frames entering the apparatus via the one or more inter-network interfaces 30 and data frames output from the apparatus comply with synchronous digital transmission network standard.

Wherein the one or more mapping/demapping device maps Ethernet data frames entering the apparatus via the one or more subscriber network interfaces 20 to synchronous digital data frames, and output the mapped data frames via the one or more inter-network interfaces 30; further, the one or more mapping/demapping devices demap synchronous digital data entering the apparatus via the one or more inter-network interfaces 30 to Ethernet data frames, and output data frames via the one or more subscriber network interfaces 20. However, the functionality of the apparatus is simple, thus it can only provide Ethernet private line services.

FIG. 2A shows a block diagram of an apparatus utilizing the bridge scheme in the second prior art. The apparatus includes one or more subscriber network interfaces 20 (standard Ethernet interfaces), each of which corresponds to a unique bridge port. The apparatus further includes one or more inter-network interfaces 30 (synchronous digital transmission channels). The apparatus further includes a bridge device 400 (described in detail in IEEE802.1D and IEEE802.1Q), wherein the bridge device 400 includes a plurality of bridge ports, each of which corresponds to a unique subscriber network interface or a unique mapping/demapping device. Each mapping/demapping device corresponds to a unique bridge port and a unique inter-network interface. Wherein, data frames entering the apparatus via the one or more subscriber network interfaces 20 and data frames output from the apparatus comply with Ethernet data standard; data frames entering the apparatus from the one or more inter-network interfaces 30 and data frames output from the apparatus comply with the standard of synchronous digital transmission network.

The data frames entering the apparatus via the one or more subscriber network interfaces 20 enter the bridge device 400 via bridge ports corresponding to the one or more subscriber network interfaces 20 interface. The bridge device 400 calculates a bridge output port according to the address information in the data frames and sends the data frames to the corresponding mapping/demapping device 102 (the mapping/demapping device maps the data frames and then outputs them to the inter-network interface) via the output port, and vice versa.

In the bridge scheme, usually the operator is allowed to map partial or all subscriber network interfaces to mapping/demapping devices in a one to one way through configuration. In this case, the apparatus employs both of above technical schemes, so it is called an enhanced bridge scheme. The functional model of an enhanced bridge device is shown in FIG. 2B.

The disadvantage of the second prior art is:

(1) It is unable to provide integral VLAN service. If a plurality of subscribers are attached to the apparatus via the one or more subscriber network interfaces and there are conflicts among address spaces of Ethernet data frames of those subscribers, the apparatus is unable to isolate the conflicts effectively, thus it is unable to provide services correctly to those subscribers.

(2) A common bridge (non-enhanced bridge) is unable to provide Ethernet private line service.

(3) One subscriber network interface can only support one service type (Ethernet private line service or VLAN service), which limits the access capability of the apparatus. In some cases, though the processing capacity of the device is still sufficient enough, new devices have to be added to improve access capacity because the subscriber network interfaces have been used up.

(4) One inter-network interface can only support one service type (Ethernet private line service or VLAN service), which leads to low convergence capability of the apparatus. In some cases, in a star topology network, though the processing capacity of the apparatus is still sufficient enough, new devices have to be added to improve convergence capacity because the inter-network interfaces have been used up. For operators, it means not only new investment but also bandwidth waste.

FIG. 3 shows a block diagram of an apparatus utilizing the RPR scheme in the third prior art. The apparatus includes one or more subscriber network interfaces (standard Ethernet subscriber network interfaces), two inter-network interfaces (synchronous digital transmission channels), an RPR device 600 (described in IEEE802.17), two mapping/demapping devices, and a data processing device 500, which may be a data converging/diverging device or a bridge device.

Wherein the data frames entering the apparatus via the one or more subscriber network interfaces are processed as follows:

Step 1: the data processing device 500 processes the data frames (the data frames are converged if the data processing device is a data converging/diverging device; the data frames are switched if the data processing device is a bridge device);

Step 2: the data processing device 500 transfers the processed data frames to the RPR device 600;

Step 3: the RPR device 600 sends the data frames to the corresponding mapping/demapping device according to the address information in the data frames;

Step 4: the mapping/demapping device maps the data frames and sends them to outside of the apparatus via the corresponding inter-network interface.

The data frames entering the apparatus via the inter-network interface are processed as follows:

Step 1: the mapping/demapping device performs demapping operation for the data frames and transfers the demapped data frames to the RPR device 600;

Step 2: the RPR device 600 processes the data frames and then sends them to the data processing device;

Step 3: the data processing device 500 processes the data frames (the data frames are diverged if the data processing device is a data converging/diverging device; the data frames are switched if the data processing device is a bridge device);

Step 4: the data processing device 500 finds corresponding subscriber network interface according to the address information in the data frames and then outputs the data frames via the subscriber network interface.

The disadvantages of the scheme are:

(1) It is unable to provide Ethernet private line service and VLAN service at the same time. If the data processing device is a bridge device, it doesn't support Ethernet private line service; if the data processing device is a data converging/diverging device, it doesn't support VLAN service.

(2) It can only be used in a ring topology network.

SUMMARY OF THE PRESENT INVENTION

An object of the present invention is to provide a virtual bridge device in SDH/SONET network and the method of accessing and transmitting data frames in a SDH/SONET network thereof, in order to improve the converging ability.

According to one aspect of the present invention, it is provided a system accessing and transmitting different data frames in a digital transmission network for accessing and transmitting different data frames, the system comprises:

At least a subscriber network interface, which is used to couple with the user's network; and/or at least an inter-network interface, which is used to couple with the digital transmission network to transfer data; and a data converting device, which is coupled with the subscriber network interfaces and the inter-network interfaces to convert data formats between the subscriber network interfaces, data formats between the inter-network interfaces, or data formats between the inter-network interfaces and the subscriber network interfaces;

Wherein the data converting device comprises a virtual private device, an interface device and a processing device. The virtual private device exchanges data between the subscriber network interfaces and the inter-network interfaces via the interface device. Wherein the virtual private device comprises an inter-device interface, which couples with the processing device and is used to input and output data frames; a virtual private processing unit, which couples with the inter-device interface and is used to converge or diverge the data frames and detect control messages; a rule database, which couples with the virtual private processing unit, the rule database stores rules corresponding to various data, couples with the virtual interface processing unit to process the data according to the rules; a control interface unit, which couples with the rule database and the virtual private processing unit and is used to control the virtual private processing unit and the rule database.

Optionally, the rule database stores convergence rule and divergence rule.

Preferably, the rule database stores relay rules.

Optionally, one data type corresponds to one rule, rule database comprises the following rules: input data frame type number, rule type (one of convergence, divergence and relay rules), label number and output data frame type number.

Preferably, formats of the control messages and the logic processing the data frames are stored in the virtual private processing unit; and formats of rules are stored in the rule database.

Optionally, the control interface unit provides an external control interface, through which to inspect the operation of the virtual processing unit, and add, delete, modify, and search operation can be performed to rules in the rule databases.

Preferably, the interface device is a virtual interface device, the processing device is a data processing and dispatching device, the inter-device interface connects with the data processing and dispatching device or the virtual interface device.

The present invention also provides a method of accessing and transmitting different data frames in a digital transmission network through the virtual private device; the system comprises virtual bridge devices, the method comprises the following steps:

Data frames entering the virtual private device via an inter-device interface;

determining whether the data frames are control messages;

If yes, sending the data frames to external control system via the control interface unit and end the process; If not, extracting input data type number information and search in the rule database according to the input data type number;

Determining whether type number information is found;

If not, discard the data frames and end the process;

If yes, process the data according to the rule type;

Modify the data frames, and send them through the inter-device interface and end the process.

Optionally, the step of processing the data according to the rule type comprises the following steps:

Determine the rule type,

If it is convergence rule, insert the label number defined in the rule in the special position of the data frames;

If it is divergence rule, remove the label number in the special position of the data frames;

If it is relay rule, change the label number in the special position of the data frames into a label number defined in the rule.

Preferably, the step of modifying the data frames comprises the step of replacing the data frame type number in the head position of the data frames with the output data frame type number defined in the rule.

The system and method according to the present invention have the following advantages:

(1) a plurality of convergence rules, divergence rules and relay rules are stored in the virtual private device (relay rules are optional, i.e., relay rules are not used in some simple virtual private devices). One data type corresponds to one rule. Rules in the virtual private devices can be set up and deleted dynamically. Data frames of different users can be isolated, transmitted and shared by adding a label before sending, changing the label during transmission and removing the label at destination address.

(2) according to the system and method of the present invention, both VLAN service and Ethernet data private service can be achieved at a device interface (a subscriber network interface or an inter-network interface). And data frames of many subscribers can be accessed and converged at a device interface, thus the accessing and converging abilities of the device are improved greatly.

BRIEF DESCRIPTION OF THE DRAWINGS

FIG. 4 (F) shows the data processing flowchart of a preferred embodiment of the system accessing and transmitting Ethernet data frames in an SDH/SONET network;

FIG. 4A (F1) shows the flowchart of the virtual interface device processing the data entering from the interface of processing device in a preferred embodiment of the system accessing and transmitting Ethernet data frames in an SDH/SONET network according to the present invention;

FIG. 4A (F2) shows the flowchart of the virtual interface device processing the data entering from the inter-device interface in a preferred embodiment of the system accessing and transmitting Ethernet data frames in an SDH/SONET network according to the present invention;

FIG. 5 (F) shows the flowchart of the virtual private device processing the data entering from the inter-device interface in a preferred embodiment of the system accessing and transmitting Ethernet data frames in an SDH/SONET network according to the present invention;

FIG. 6 (F1) shows the flowchart of the virtual bridge device processing the data entering from the inter-device interface in a preferred embodiment of the system accessing and transmitting Ethernet data frames in an SDH/SONET network according to the present invention;

FIG. 7 (F) shows the flowchart of the data processing and dispatching device processing the entered data in a preferred embodiment of the system accessing and transmitting Ethernet data frames in an SDH/SONET network according to the present invention;

DETAILED DESCRIPTION OF THE EMBODIMENTS

To make the system and method of the present invention be better understood, the basic function of the device is describe first. Usually, any device has the following 3 functions:

(1) Input function, i.e., receive external information;
(2) Processing function, i.e., process the external information;
(3) Output function, i.e., output the processed information.

For a device accessing and transmitting Ethernet data frames in an SDH/SONET network:

(1) Input function: receive external information via the subscriber network interfaces and the inter-network interfaces;
(2) Output function: output the processed information via the subscriber network interface and the inter-network interface;
(3) Processing function: for a device accessing and transmitting Ethernet data frames in an SDH/SONET network, different processing abilities as well as service ability and service efficiency depend on different technical schemes.

In addition, the phrase "standard Ethernet interface" used in the present invention means the following:

IEEE802.3 defines the LAN interface in detail. Such an interface is regarded as a standard Ethernet interface in the present invention.

The present invention will be described hereunder with reference to the drawings. For concision, components and units described in prior art will not be described in detail hereunder. And components and units described above will not be described in detail hereunder.

Figure 1:
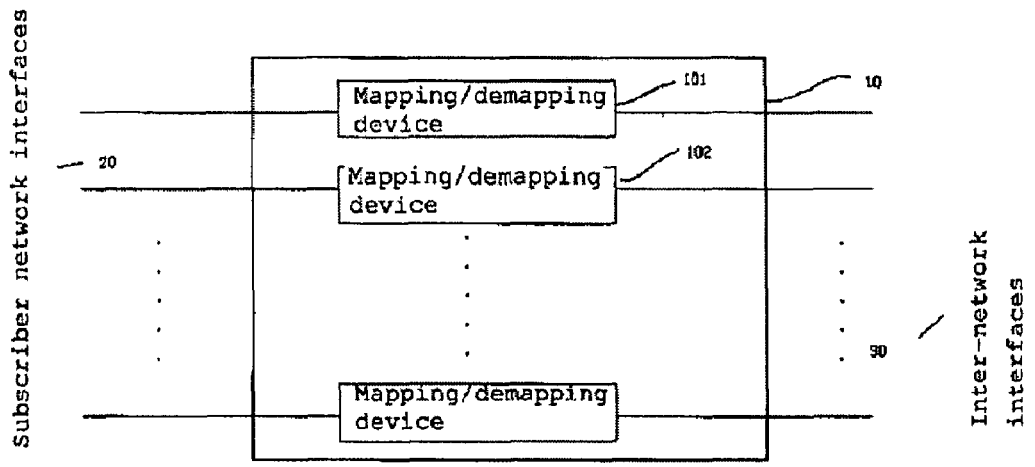
FIG. 1 shows the block diagram of the data mapping/demapping scheme according to the first prior art.
Figure 2A:
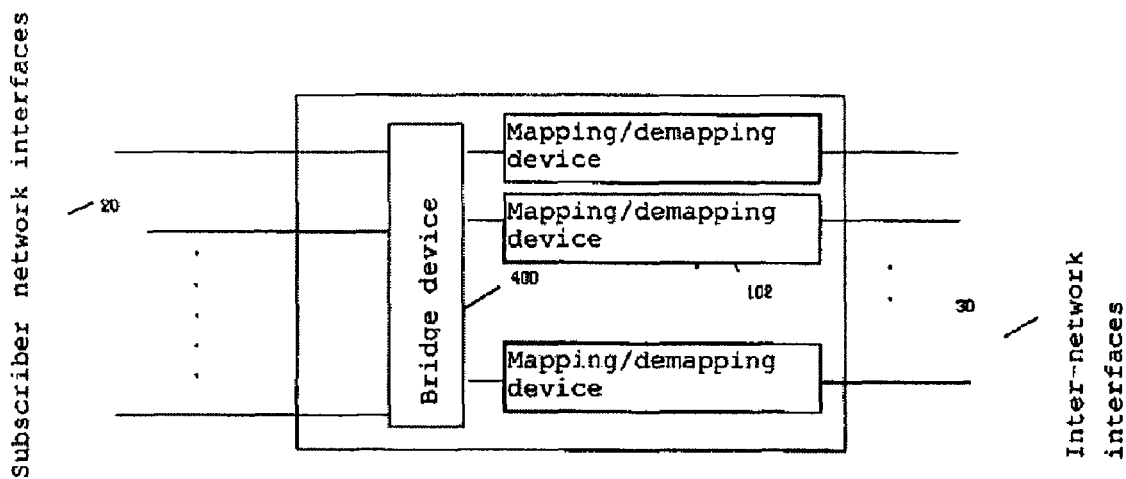
FIG. 2A shows the block diagram of the bridge scheme according to the second prior art.
Figure 2B:
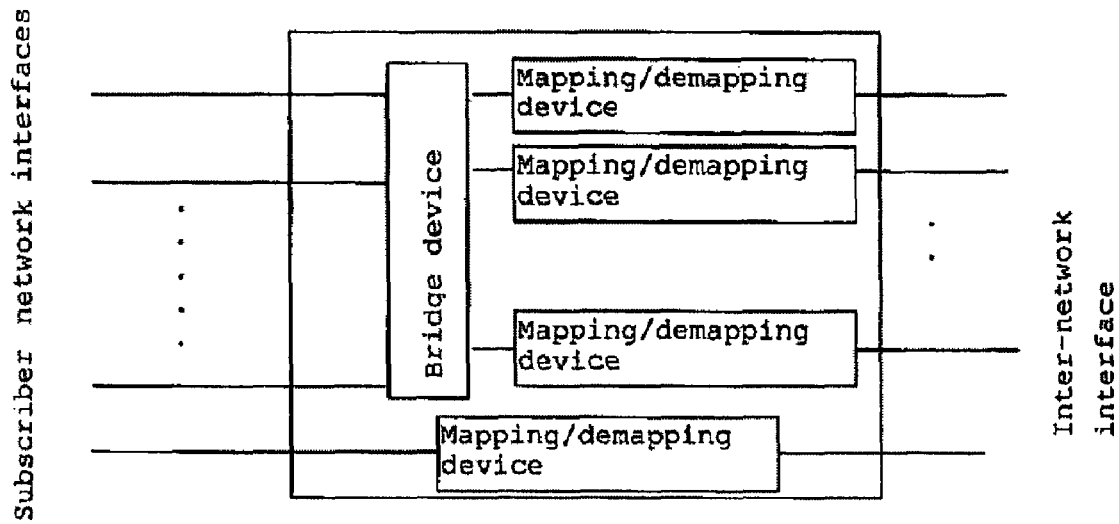
FIG. 2B shows the block diagram of the enhanced bridge scheme according to the second prior art.
Figure 3:
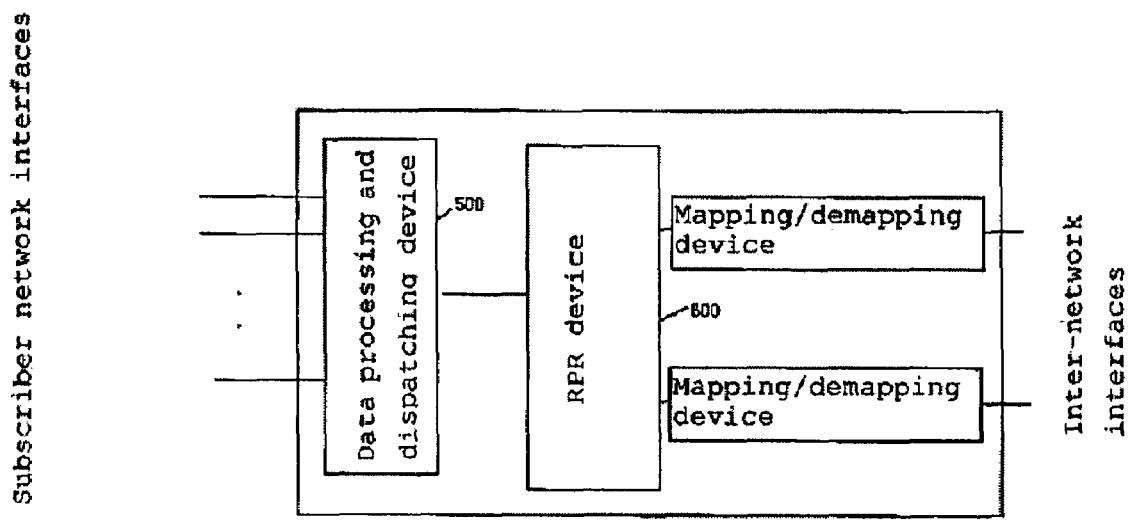
FIG. 3 shows the block diagram of RPR scheme according to the third prior art.
Figure 4:
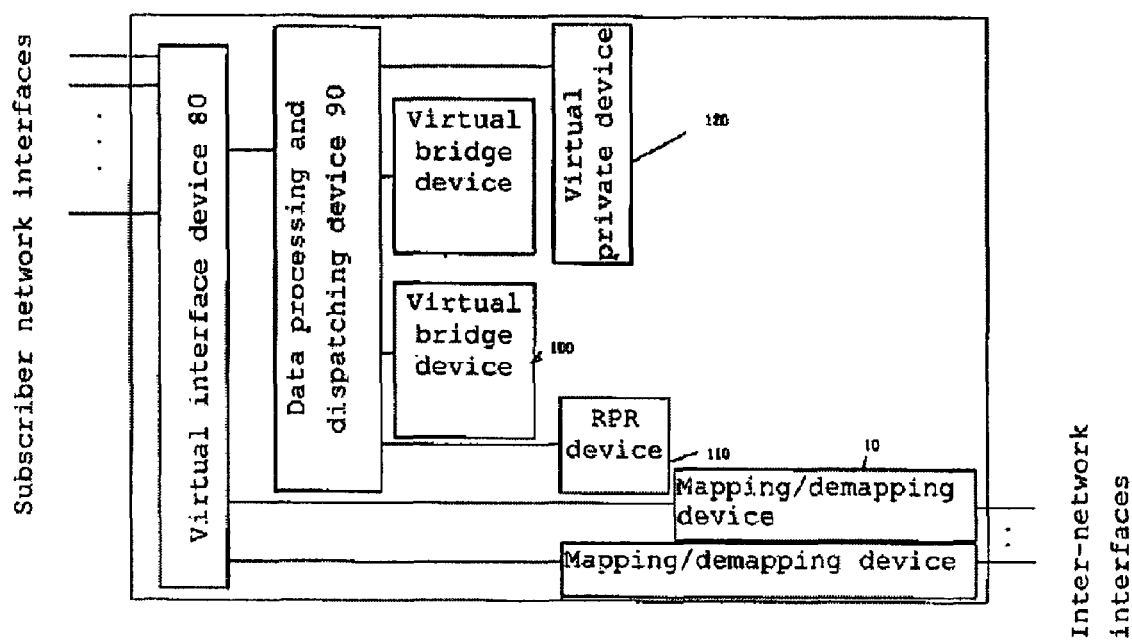
FIG. 4 shows the schematic diagram of a preferred embodiment of the system accessing and transmitting Ethernet data frames in an SDH/SONET network according to the present invention.
Figure 4F:
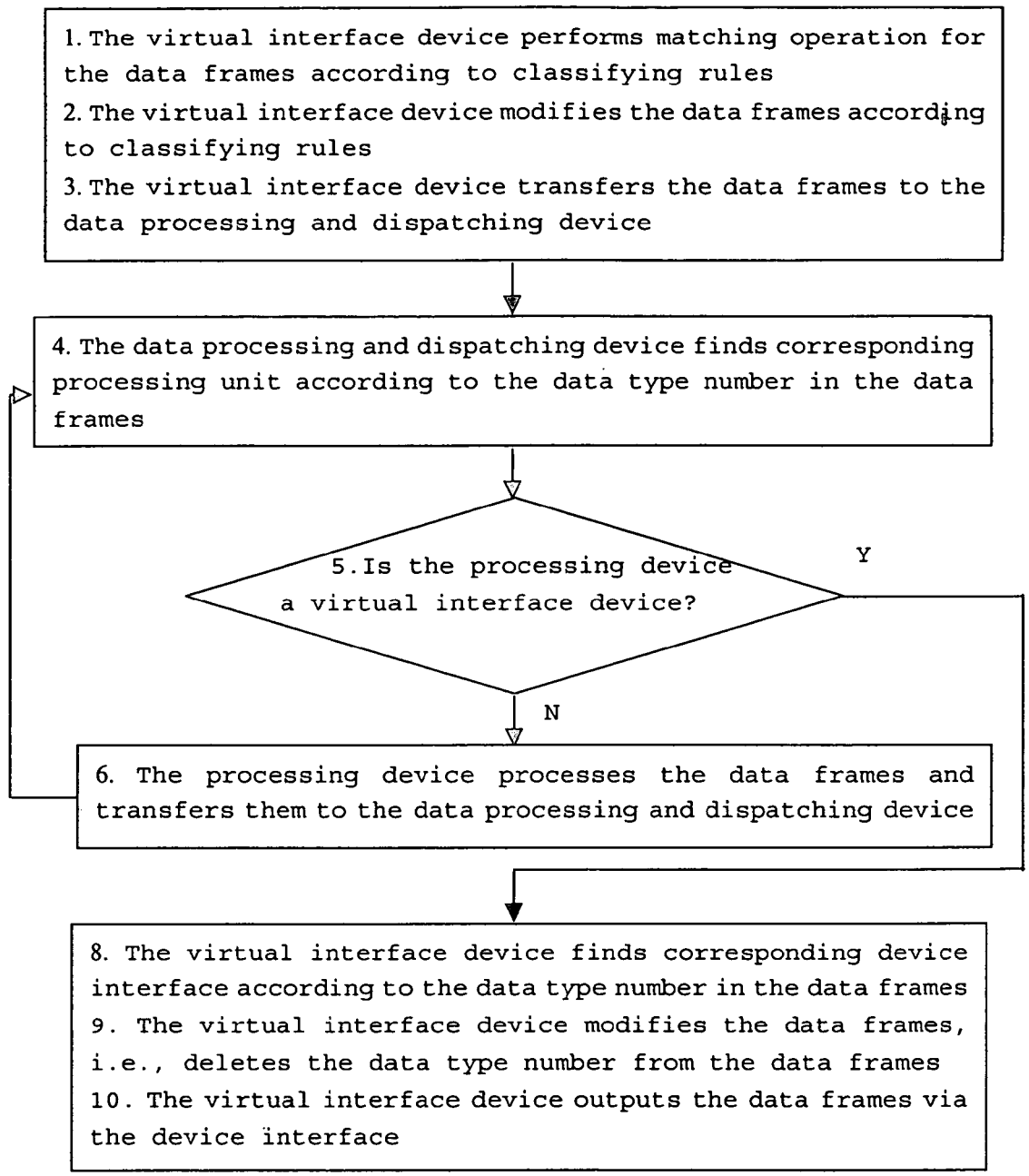
FIG. 4A shows the schematic block diagram of virtual interface device in a preferred embodiment of the system accessing and transmitting Ethernet data frames in an SDH/SONET network according to the present invention.

FIG. 4 shows a system that accesses and transmits different data frames in a digital transmission network. The system comprises a plurality of subscriber network interfaces designed to couple with the subscribers' networks, a plurality of inter-network interfaces designed to couple with the digital transmission network to transmit data frame, a plurality of mapping/demapping devices 10, a virtual interface device 80 coupled with the plurality of subscriber network interfaces and also coupled with the plurality of inter-network interfaces via the plurality of mapping/demapping devices 10, a data processing and dispatching device 90 coupled with the virtual interface device 80, a virtual private devices 120 and a plurality of virtual bridge devices 100 and a PRP device 110 coupled with the data processing and dispatching device. Wherein the plurality of mapping/demapping devices 10, the virtual interface device 80, and the data processing and dispatching device 90 constitute the data converting device of the present invention. The input to the system includes: (1) data frames entering the system via the plurality of subscriber network interfaces; (2) data frames entering the system via the plurality of inter-network interfaces. The data frames output from the system includes: (1) data frames from the plurality of subscriber network interfaces; (2) data frames from the plurality of inter-network interfaces.

Figure 5:
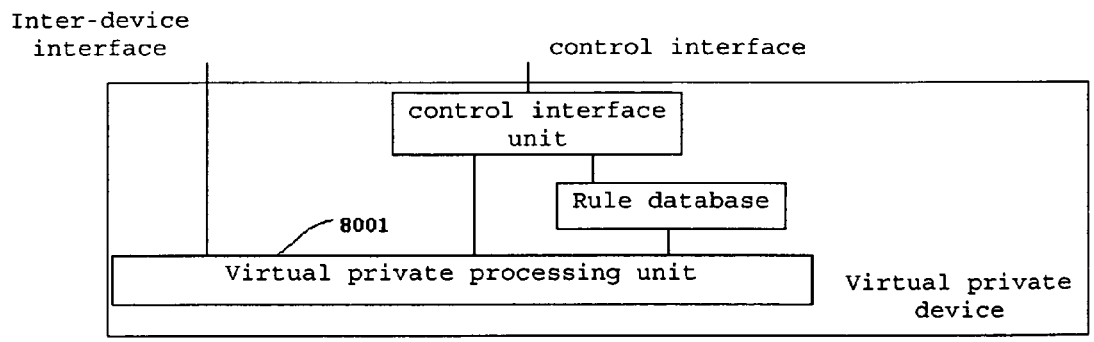
FIG. 5 shows the schematic block diagram of the virtual private device in a preferred embodiment of the system accessing and transmitting Ethernet data frames in an SDH/SONET network according to the present invention.
Figure 5F:
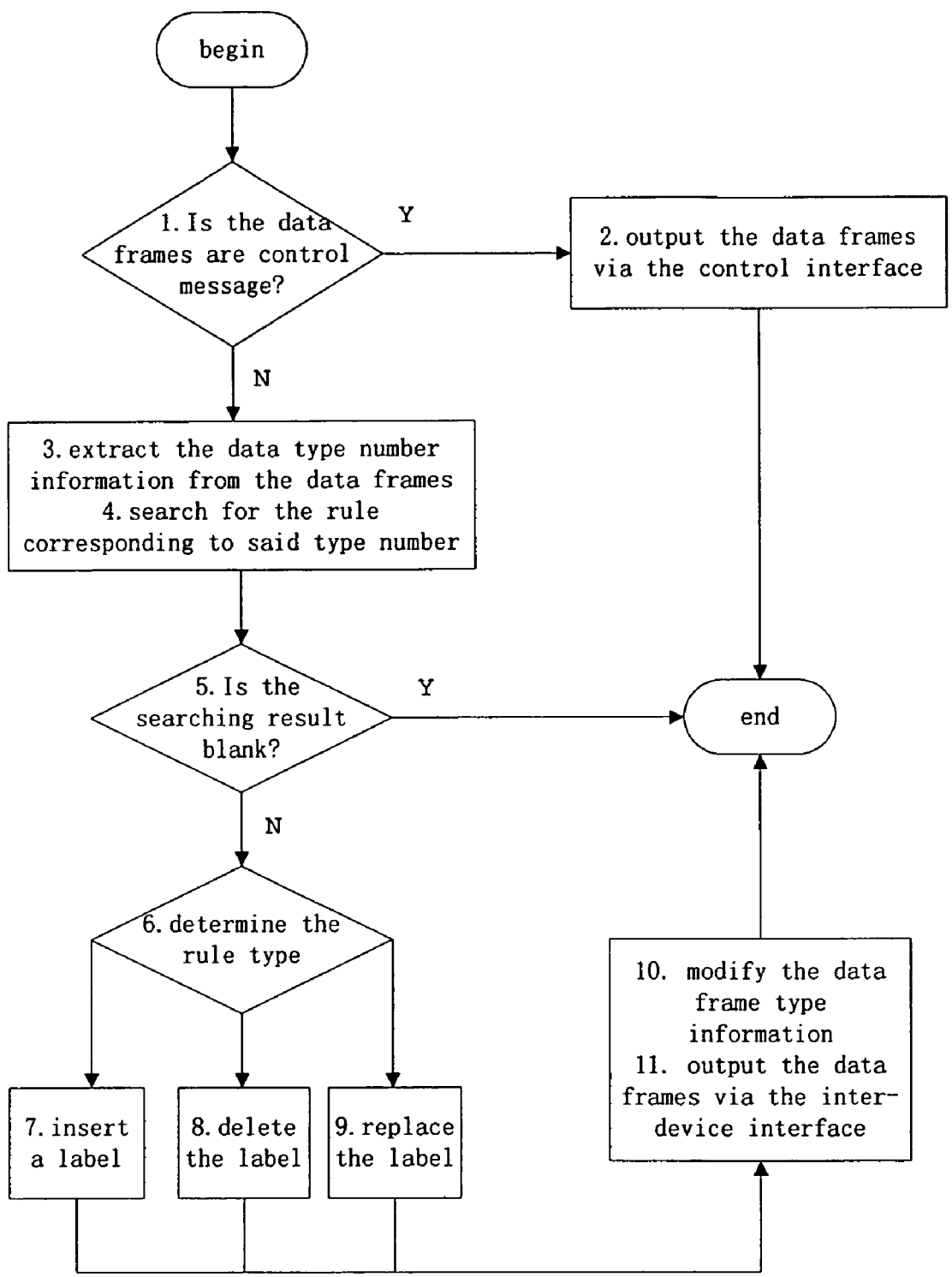

FIG. 5 shows the schematic block diagram of a virtual private device in a preferred embodiment of the system accessing and transmitting Ethernet data frames in an SDH/SONET network according to the present invention. The system accessing and transmitting Ethernet data frames in an SDH/SONET network includes a plurality of subscriber network interfaces designed to couple with the subscribers' networks, a plurality of inter-network interfaces designed to couple with the digital transmission network to transmit data frames, a plurality of mapping/demapping devices 10, a virtual interface device 80 coupled with the plurality of subscriber network interfaces and also coupled with the plurality of inter-network interfaces via the plurality of mapping/demapping devices 10, a data processing and dispatching device 90 coupled with the virtual interface device 80, a virtual private devices 120 and a plurality of virtual bridge devices 100 and a PRP device 110 coupled with the data processing and dispatching device. In the virtual private device, a virtual private processing unit 8001 is coupled to an inter-device interface to process data frames from the inter-device interface. The virtual private processing unit 8001 is also coupled to a rule database and a control interface unit. The control interface unit exchanges data frames with outside world via a control interface.

The present invention enhances the converging ability of the system through utilizing the virtual private device. The virtual private device stores converging rules, diverging rules, and relay rules (the relay rules are optional and unnecessary in some simple virtual private devices). The mapping relationship between data types and the rules is 1:1. The rules in the virtual private device can be set up and deleted dynamically. Data frames of different subscribers can be isolated, transmitted and shared by adding a label before sending, changing the label during transmission and removing the label at destination address. A virtual private device comprises a virtual private processing unit and a rule database in it.

The virtual private processing unit has two major functions:

(a) Detecting control messages and transferring the control messages to a control system of the virtual private device via the control interface unit.

(b) Performing convergence, divergence, or relay operation for data frames except for the control messages.

The virtual private processing unit is the processing center of the virtual private device; the following items are stored in the virtual private processing unit as firmware:

(a) Format of control messages;
(b) Processing steps and logic for data frames;
(c) Format of rules in the rule database;

As a control center, the rule database controls the processing action of the virtual private processing unit. The rules in the rule database may be updated dynamically. The rule database may store a plurality of rules, each of which comprises the following information: input data frame type number, rule type (convergence/divergence/relay), label number, and output data frame type number.

Wherein the virtual private device is connected to the data processing and dispatching device via the inter-device interface; the virtual private device is connected to the control system of the device via the control interface.

There are different technical schemes to implement the virtual private device. However, the processing steps and logic for data frames in the virtual private processing unit are identical under these schemes. The main differences between these schemes are:

(a) Format of rules in the rule database, for example, the length and position of a label in the rule are different;

(b) Format of control messages processed in the virtual private processing unit.

In view of expandability and compatibility, it is recommended to implement the virtual private device with MPLS, GFP, VMAN, or Nested VLAN technique. The device manufacturers may also employ self-defined label formats (or self-defined data frame packets) to implement the virtual private device. The system may support a plurality of virtual private devices implemented with different technical schemes.

FIG. 5 (F) shows the flowchart of the virtual private processing; for data frames entering the virtual private device via the inter-device interface, the processing steps of the virtual private processing unit are as follows:

Step 1: determining whether the data frames are control messages; if not, going to step 3;

Step 2: transferring the data frames to an external control system via the control interface unit, and then going to step 12;

Step 3: extracting an input data type number from the head position of the data frames;

Step 4: searching in the rule database with the index of the input data type number;

Step 5: determining a searching result; if it is blank, discarding the data frames and going to step 12;

Step 6: determining a rule type; if it is a convergence rule, going to step 7; if it is a divergence rule, going to step 8; if it is a relay rule, going to step 9;

Step 7: modifying the data frames, i.e., inserting a label number defined in the rule at a special position of the data frames, and then going to step 10;

Step 8: modifying the data frames, i.e., removing a label number at a special position of the data frames, and then going to step 10;

Step 9: modifying the data frames, i.e., replacing a label number at a special position of the data frames with a label number defined in the rule;

Step 10: modifying the data frames, i.e., replacing the data type number at the head position of the data frames with an output data type number defined in the rule;

Step 11: transferring the data frames to the data frame processing and dispatching device via the inter-device interface;

Step 12: ending.

FIG. 4 (F) shows the processing steps for data frames entering the system via the subscriber network interfaces.

First, in step 1, the virtual interface device performs matching action to the data frames according to classifying rules;

In step 2, the virtual interface device modifies the data frames according to classifying rules, i.e., inserts a data type number in the data frames;

In step 3, the virtual interface device transfers the modified data frames to the data processing and dispatching device;

In step 4, the data processing and dispatching device finds a corresponding processing device according to the data type number in the data frames;

In step 5, the data processing and dispatching device transfers the data frames to the corresponding processing device; if it is the virtual private device to process the data frames, the data frames are transferred to the virtual private device; if it is the virtual interface device to process the data frames, goes to step 8;

In step 6, the corresponding processing device processes the data frames, and modifies the data type number at the end of the processing, and then transfers the modified data frames to the data processing and dispatching device;

In step 7, the procedure goes to step 4;

In step 8, the virtual interface device finds a corresponding device interface according to the data type number in the data frames;

In step 9, the virtual interface device modifies the data frames, i.e., deletes the data type number from the data frames;

In step 10, the virtual interface device outputs the modified data frames via the device interface (if the device interface is an inter-network interface, mapping operation should be performed through the mapping/demapping device before output).

The processing steps for data frames entering the device via the network-network interface are as follows:

In step 1, the mapping/demapping device performs demapping operation to the data frames;

In step 2, the remaining processing steps are identical to those for data frames entering the system via the subscriber network interfaces.

When implementing functions of the system, the device manufacturers may partially or completely employ above method. For devices with simple functions, the processing is relatively simple. The device manufacturers may even treat the processing as firmware through fixing connections among the devices to omit the data processing and dispatching device.

Figure 4A:
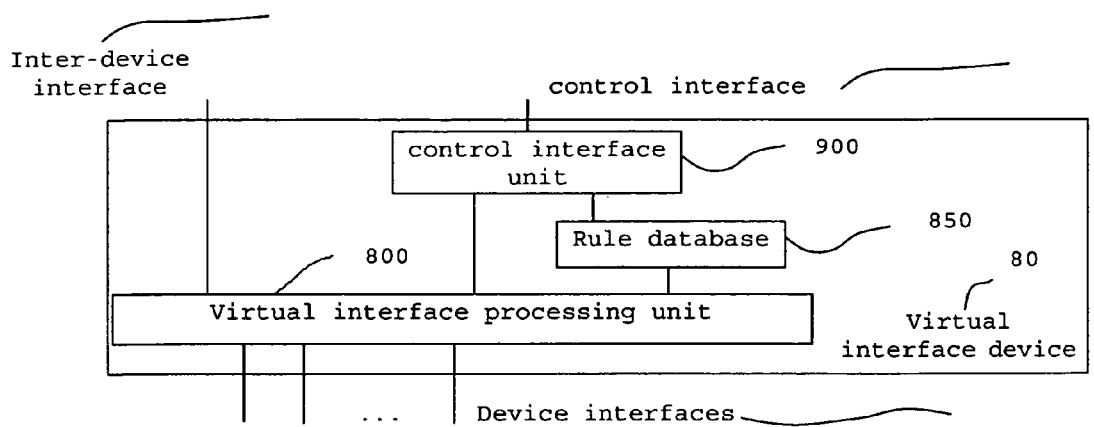

FIG. 4A shows the schematic block diagram of virtual interface device in a preferred embodiment of the system accessing and transmitting Ethernet data frames in an SDH/SONET network according to the present invention. The virtual interface device 80 is used to enhance access ability. Via the virtual interface device 80, one device interface (subscriber network interface 20 or inter-network interface 30) may be expanded to a plurality of virtual interfaces, each of which supports specific subscribers and services. For data frames entering the system via the device interfaces (subscriber network interface 20 and inter-network interface 30), a virtual interface processing unit 800 of the virtual interface device will classify them according to different services required by the subscribers and choose corresponding processing for them. Different processing corresponds to different rules in the rule database 850. A control interface unit controls the virtual interface processing unit 800 to classify the data frames according to orders from a control interface and searches for corresponding rules stored in the rule database 850 to process the data frames. Data frames output from the device are transferred to a corresponding device interface after classified in the virtual interface device. Because the virtual interface device stores N rules, the mapping relationship between the device interface and those rules is 1:N. The rules in the virtual interface device may be set up or deleted dynamically. Therefore, it is easy to modify the rules to enhance the adaptability of the system according to the subscribers' requirements and the updating of the system. The device also comprises a software loader (not shown) to load different software.

As a processing center, the virtual interface processing unit 800 is responsible for processing the data frames; the processing steps and processing logic in the virtual interface processing unit are firmware and can't be modified during operation of the system. The rule database is a control center and is responsible for providing relevant processing and control parameters when the virtual interface processing unit processes the data frames. Different parameters lead to corresponding processing behaviors. During operation of the system, the rules in the rule database may be updated. The control interface unit provides an external control interface. Via the control interface, the control system of the device may monitor the virtual interface processing unit and performs adding, deleting, editing, and querying operations to rules in the rule database. The rule database may store a plurality of rules, each of which contains five parts: device interface number, data frame type number, data frame address offset, data frame type value, and data frame comparison mask.

Wherein the virtual interface device is connected to the subscriber network interfaces or the inter-network interfaces via the device interfaces. The mapping relationship between the subscriber network interfaces (or inter-network interfaces) and the device interfaces is 1:1. The virtual interface device is connected to the data processing and dispatching device via the inter-device interface. The virtual interface device is connected to the control system of the device via the control interface.

FIG. 4A (F1) shows the steps of the virtual interface processing unit processing data frames entering the virtual interface device via the device interface:

Step 1: searching for the first rule in the rule database corresponding to the device interface with the index of the device interface number;

Step 2: determining the searching result; if it is blank, discarding the data frames and going to step 10;

Step 3: reading information at address offset of the data frame according to the data frame address offset in the rule;

Step 4: performing "AND" operation between the read information and the data frame comparison mask in the rule;

Step 5: comparing the result of step 4 with the data frame type value in the rule; if they are equal, going to step 8;

Step 6: searching for the next rule corresponding to the device interface in the rule database;

Step 7: going to step 2;

Step 8: modifying the data frames, i.e., inserting a data type number in the rule in the head position of the data frames;

Step 9: transferring the data frames to the data frame processing and dispatching device via the inter-device interface;

Step 10: ending.

FIG. 4A (F2) shows the steps of the virtual interface processing unit processing data frames entering the virtual interface device via the inter-device interface. The processing steps are as follows:

Step 1: extracting the data frame type number from a head position of the data frames;

Step 2: searching in the rule database with the index of data frame type number;

Step 3: determining the searching result; if it is blank, discarding the data frames and going to step 6;

Step 4: modifying the data frames, i.e., deleting the data frame type number from the head position of the data frames;

Step 5: sending the data frames to a corresponding device interface according to the device interface number in the rule;

Step 6: ending.

Figure 7:
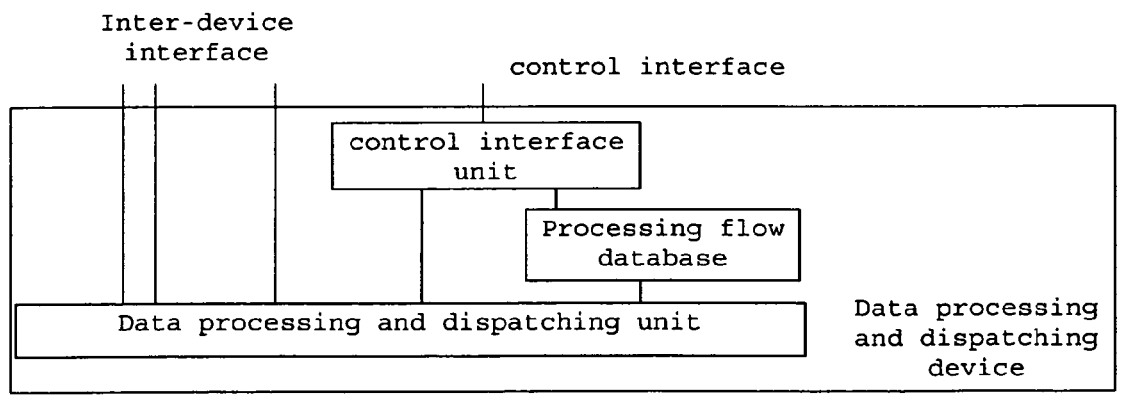
FIG. 7 shows the schematic block diagram of the data processing and dispatching device in a preferred embodiment of the system accessing and transmitting Ethernet data frames in an SDH/SONET network according to the present invention.
Figure 6:
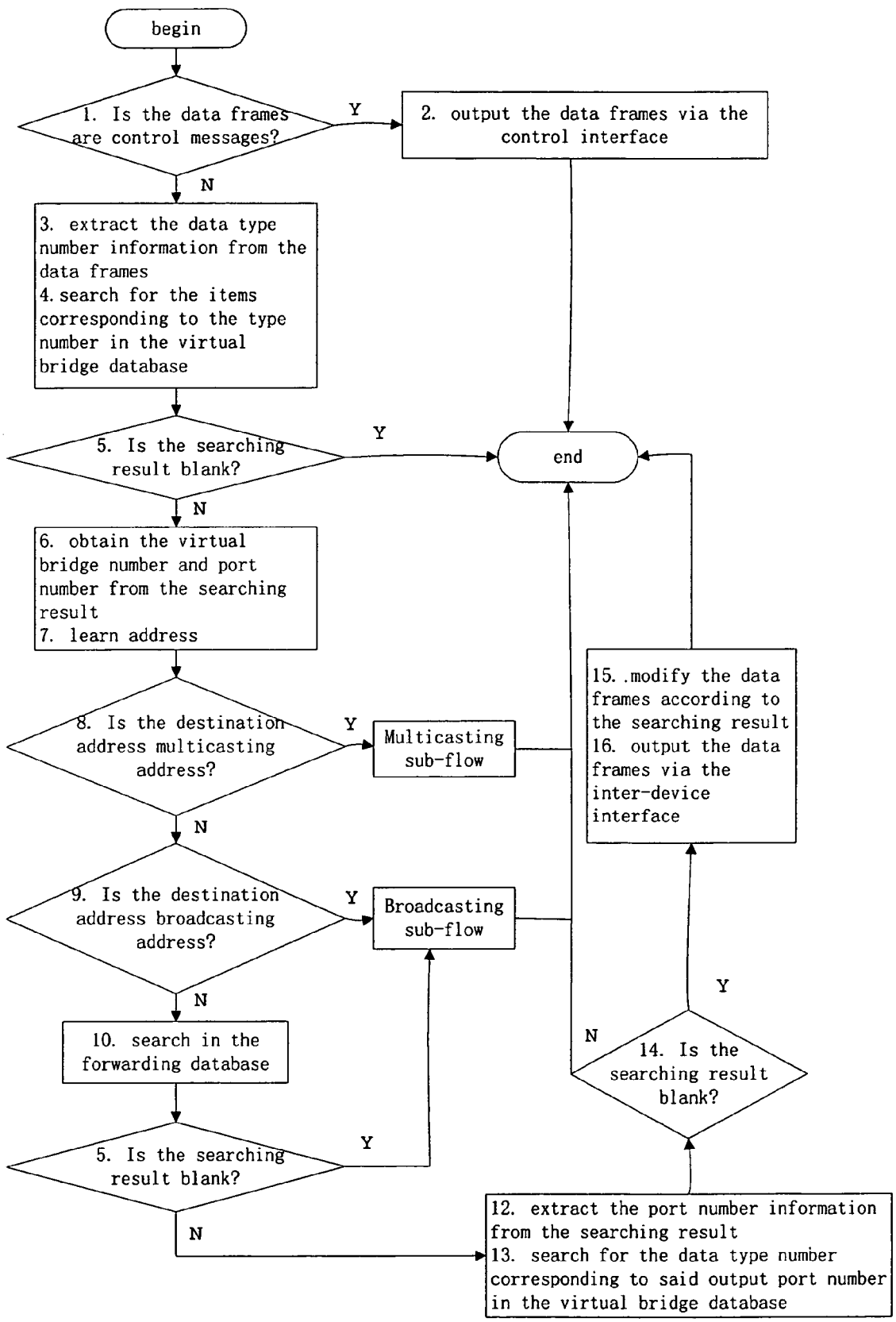
Figure 7F:
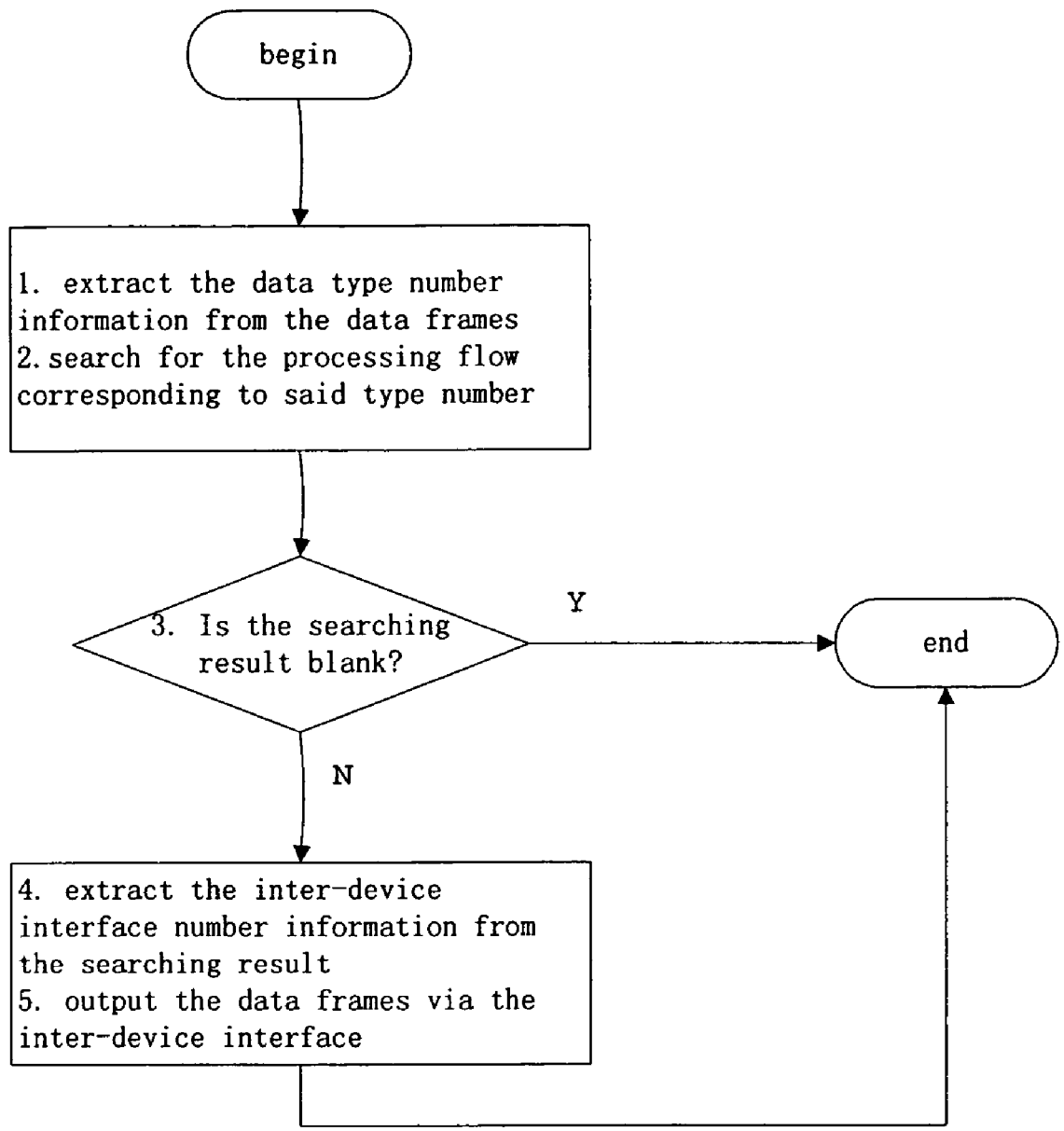

FIG. 7 shows the schematic block diagram of the data processing and dispatching device in a preferred embodiment of the system accessing and transmitting Ethernet data frames in an SDH/SONET network according to the present invention. In the data processing and dispatching device, a data processing and dispatching unit is coupled with a plurality of inter-device interfaces to process data frames from the inter-device interfaces. The data processing and dispatching unit is also coupled with a processing steps database and a control interface unit. The control interface unit exchanges data with outside world via a control interface.

The present invention utilizes the data processing and dispatching device to implement individualized services to improve equipment serviceability. The data processing and dispatching device stores a plurality of processing flows. The mapping relationship between the processing flows and data frame types is 1:1. The data processing and dispatching device finds a corresponding processing flow according to a data frame type, and informs other devices to process the data frames according to the processing flow. The processing flows in the data processing and dispatching device may be set up, edited, or deleted dynamically. During operation of the system, the operator may quickly provide individualized services to maximize the efficacy of the system through adding, editing, and deleting the processing flows in the data processing and dispatching device.

The data processing and dispatching device is a processing center of the system, and the processing flows are embedded in it as firmware. There are a plurality of inter-device interfaces in the data processing and dispatching device, each of which maps to a unique external device. The mapping relationship between the inter-device interfaces and the external devices are fixed.

The processing flow database is a control center of the system, and the items in the database may be updated dynamically. Each processing flow in the processing flow database contains the following information:

(a) Data frame type number;
(b) Inter-device interface number

The data processing and dispatching device is connected to other devices via the inter-device interfaces, each of the inter-device interfaces maps to one virtual bridge device, one virtual private device, one RPR device, or one virtual interface device. The data processing and dispatching device is connected to the control system thereof via the control interface.

Figure 6:
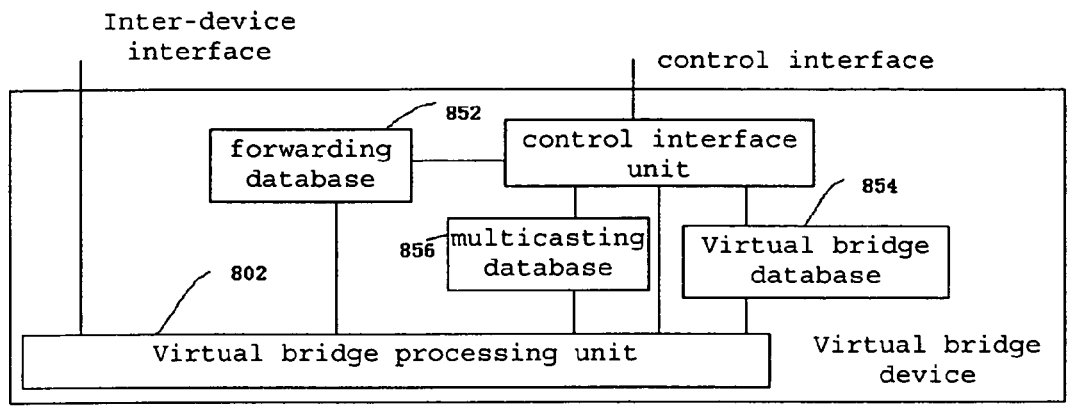
FIG. 6 shows the schematic block diagram of the virtual bridge device in a preferred embodiment of the system accessing and transmitting Ethernet data frames in an SDH/SONET network according to the present invention.

FIG. 6 shows the schematic block diagram of a virtual bridge device in a preferred embodiment of the system accessing and transmitting Ethernet data frames in an SDH/SONET network according to the present invention. The present invention overcomes the issue of limited Ethernet data frame address space through the virtual bridge devices. One virtual bridge device may provide a plurality of virtual bridges. Each virtual bridge possesses all features and properties of the bridge device. However, it is different to the bridge device that the virtual bridge may be set up and deleted dynamically. During operation of the system, the operator may set up or delete a plurality of virtual bridges dynamically. Because each virtual bridge has an independent address space, the operator may provide VLAN services to subscribers with different virtual bridges if conflicts exist among address spaces.

The operator may configure a virtual bridge just like a physical bridge. The virtual bridge further expands the features of the physical bridge to support VMAN-based switching operation. Each of the virtual bridge devices comprises a virtual bridge processing unit 802, a multicasting database 856, a control interface unit, a forwarding database 852, and a virtual bridge database 854.

The virtual bridge processing unit has 3 major functions:

(a) Detecting control messages and transferring the control messages to a control system of the device via the control interface unit.

(b) Learning addresses, and storing the knowledge acquired into the forwarding database;

(c) Performing switching for data frames except for control messages and modifying data type information in the data frames.

The virtual bridge processing unit is a processing center of the virtual bridge device, and there are five items embedded in it:

(a) Format of control messages;
(b) Processing steps and logic for data frames;
(c) Format of forwarding items in the forwarding database;
(d) Format of multicasting items in the multicasting database;
(e) Format of items in the virtual bridge database The virtual bridge database, multicasting database, and forwarding database control processing behaviors of the virtual bridge processing unit, and the items in them may be updated during operation of the system. The data formats of items in the multicasting database items and forwarding database are identical, and each item contains the following information:

(a) Virtual bridge number;
(b) Input port of virtual bridge;
(c) Input Destination address;
(d) Input VLAN serial number;
(e) Input VMAN serial number;
(f) Output port of virtual bridge;

In the multicasting database, the database code is the combination of all fields; in the forwarding database, the database code is the combination of all fields except for output port of virtual bridge.

Each item in the virtual bridge database contains the following information:

(a) Input Type number;
(b) Virtual bridge number;
(c) Port number;
(d) Output Type number;

Via the control interface, an external control system may implement the following functions:

(a) Performing adding, deleting, editing, and querying operations to items in the database;

(b) Monitoring the working state of the virtual bridge processing unit.

The virtual bridge device is connected to the data processing and dispatching device via the inter-device interface. The virtual bridge device is connected to the control system of the device via the control interface.

FIG. 6 (F1) shows the flowchart of the virtual bridge device processing the data entering the inter-device interface in a preferred embodiment of the system accessing and transmitting Ethernet data frames in a SDH/SONET network according to the present invention. For data frames entering the device via the inter-device interface, the virtual bridge processing unit performs the following processing steps:

Step 1: determining whether the data frames are control messages; if yes, going to step 3;

Step 2: transferring the data frames to an external control system via the control interface unit, and then going to step 17;

Step 3: extracting an input data type number, a destination address, a source address, a VLAN number, and a VMAN number (optional) from a fixed position in the data frames;

Step 4: searching in the virtual bridge database with the index of the data type number extracted;

Step 5: determining a searching result; if it is blank, discarding the data frames and going to step 17;

Step 6: obtaining the virtual bridge number and port number information from the searching result;

Step 7: learning the source address, and then updating the forwarding database according to a learning result;

Step 8: determining whether the destination address is a multicasting address; if yes, executing a multicasting sub-flow, and then going to step 17;

Step 9: determining whether the destination address is a broadcast address, if yes, executing a broadcasting sub-flow, and then going to step 17;

Step 10: searching in the forwarding database with the index of virtual bridge number, input port, and destination address, VLAN number, and VMAN number (optional);

Step 11: determining the searching result; if it is blank, executing a broadcasting sub-flow, and then going to step 17;

Step 12: extracting output port number from the searching result;

Step 13: searching in the virtual bridge database with the index of the virtual bridge number and the output port number;

Step 14: determining a searching result; if it is blank, discarding the data frames and going to step 17;

Step 15: extracting an output type number from the searching result and modifying the data frames, i.e., replacing the type number in the data frames with the output data type number;

Step 16: outputting the modified data frames via the inter-device interface;

Step 17: ending.

FIG. 7 (F) shows the flowchart of the data processing and dispatching device processing the data frames entering the system in a preferred embodiment of the system accessing and transmitting Ethernet data frames in an SDH/SONET network according to the present invention. The processing steps are as follows:

Step 1: extracting a type number from the data frames;

Step 2: searching in the processing flow database with the index of the extracted type number;

Step 3: determining a searching result; if it is blank, discarding the data frames and going to step 6;

Step 4: extracting an inter-device interface number from the searching result;

Step 5: outputting the data frames via an inter-device interface corresponding to the inter-device interface number;

Step 6: ending.

Application of the system:

The operator may utilize the system shown in FIG. 4 to provide users Ethernet services, which correspond to combinations of processing flows. The operator may define and choose required processing flow combinations flexibly according to network topology, the users' service demands and bandwidth resource. Processing flow combinations common used are as follows:

Processing flow combination 1:
(1) The virtual interface device classifies the data frames;
(2) The virtual interface device outputs the data frames to corresponding device interfaces.

Processing flow combination 2:
(1) The virtual interface device classifies the data frames;
(2) The virtual bridge device switches the data frames;
(3) The virtual interface device outputs the data frames to corresponding device interfaces.

Processing flow combination 3:
(1) The virtual interface device classifies the data frames;
(2) The virtual private device processes the data frames (relay, converge, or diverge);
(3) The virtual interface device outputs the data frames to corresponding device interfaces.

Processing flow combination 4:
(1) The virtual interface device classifies the data frames;
(2) The RPR device processes the data frames (terminates, relays, or starts data frame transmission);
(3) The virtual interface device outputs the data frames to corresponding device interfaces.

When implementing functions of the system, the device manufacturers may partially or completely employ above method. For devices with simple functions, partial components can be omitted and the processing is relatively simple. The device manufacturers may even treat the processing as firmware through fixing connections among the devices to omit the data processing and dispatching device. For instance, for a device that only provides Ethernet private service, it may only comprise the following devices:

(1) One or more subscriber network interfaces;
(2) One or more inter-network interfaces and mapping/demapping devices;
(3) A virtual interface device;
(4) A virtual private device.

The device supports the following processing flow combinations:

(1) Processing flow combination 1;
(2) Processing flow combination 3.

With the system and method of the present invention, integral VLAN services can be provided for subscribers. The system and method in the present invention overcome the restriction on Ethernet data frame address space at subscriber network interfaces. When a plurality of Ethernet data frames is sent to such a network device, there is no restriction on address space of Ethernet data frames.

With the system and method of the present invention, a device interface (subscriber network interface or inter-network interface) supports both VLAN service and Ethernet private service, and a plurality of Ethernet data frames from many subscribers can be accessed and converged at a single device interface, thus the accessing and converging capability of the device is enhanced greatly.

With the system and method of the present invention, the operator may maximize processing capacity of its equipments and utilization ratio of bandwidth resource through flexible adjustment to internal processing flows according to network topology, the subscribers' service demands, and bandwidth resource.

With the system and method of the present invention, individualized services can be quickly provided for subscribers. The operator may provide new services to subscribers through creating new flow combinations, without upgrading or adding any new equipment.

According to the present invention, data frames entering the device via device interfaces are processed after classified; different data types correspond to different processing flows, which are implemented by the virtual interface devices.

Existing technical schemes and devices have to be implemented on a presumption: data frames from one device interface belong to the same type, and different types of data frames enter the device via different device interfaces. Therefore, in the prior technical scheme and system, data frames entering the device via the same device interface are processed through the same processing flow, thus the mapping relationship between processing flows and device interfaces is 1: n. As a result, if there are many data types sometimes, though the processing capacity of the device is still sufficient enough, some services can't be supported due to lack of free device interfaces.

Whereas with the system and method of the present invention, data frames from one device interface may contain various types, and processing flows for different types of data frames are different; the mapping relationship between processing flows and device interfaces is m:n.

In addition, the present invention supports free combination of processing flows; the combination of data processing and dispatching device and its processing flows is an important part of the present invention.

Existing technical schemes and devices have no data processing and dispatching device and only support several fixed processing flows. As the result, they are lack of flexibility and resiliency. However, the requirements of operators for equipment are changing actually.

A system lacking of flexibility and resiliency is unable to adapt to changing environment. With the present invention, the operator can update the processing flows dynamically, and subscribers can choose appropriate flow combinations or create new flow combinations as required. There are 22 or more processing flow combinations available.

In existing technical schemes and devices, the amount of bridge devices is certain; so conflicts among data frame address spaces of different subscribers can be avoided only through restricting the data frame address spaces of subscribers. Whereas the virtual bridge devices in the present invention support dynamical expansion (i.e., add new virtual bridges), and the address space of each virtual bridge is independent; different virtual bridges correspond to different subscribers; hence the present invention has no restriction to data frame address spaces of subscribers.

In addition, Data frames of different subscribers can be isolated, transmitted and shared by adding a label before sending, changing the label during transmission and removing the label at destination address, thus the virtual private device of the present invention is achieved.

Though the present invention is described with reference to above embodiments, it is understood that any skilled in this field can easily make any change and modification without escaping the spirit of the present invention. So any change and modification should be in the scope of the present invention.

The invention claimed is:

1. A system accessing and transmitting different data frames in a digital transmission network for accessing and transmitting different data frames, comprising:

at least one subscriber network interface, which is used to couple with a subscriber's network; and/or at least one inter-network interface, which is used to couple with the digital transmission network to transfer data frames; and a data converting device, which is coupled with the at least one subscriber network interface and the at least one inter-network interface to convert formats of the data frames between the at least one subscriber network interface, formats of the data frames between the at least one inter-network interface, or formats of the data frames between the at least one inter-network interface and the at least one subscriber network interface;

wherein the data converting device comprises: a virtual private device, an interface device and a processing device, the virtual private device exchanging data frames between the at least one subscriber network interface and the at least one inter-network interface via the interface device, and the virtual private device comprises an inter-device interface, coupled with the processing device and adapted for inputting and outputting data frames; a virtual private processing unit, coupled with the inter-device interface and adapted for detecting control messages and converging or diverging the data frames other than the control messages; a rule database, coupled with the virtual private processing unit and adapted for storing rules corresponding to the data frames, according to which the data frames are processed; and a control interface unit, coupled with the rule database and the virtual private processing unit and adapted for controlling the virtual private processing unit and the rule database.

2. The system according to claim 1, wherein the rules stored in the rule database comprise convergence rules and divergence rules.

3. The system according to claim 2, wherein the rules stored in the rule database further comprise relay rules.

4. The system according to claim 1, wherein one data frame type corresponds to one rule, each of the rules stored in the rule database comprises the following rules: input data frame type number, rule type, label number, and output data frame type number.

5. The system according to claim 1, wherein the virtual private processing unit is further adapted for storing formats of the control messages, the processing logic of the data frames, and formats of rules stored in the rule database.

6. The system according to claim 1, wherein the control interface unit is further adapted for providing an external control interface, through which the operation of the virtual private processing unit is inspected, and addition, deletion, modification, and search operations can be performed on the rules in the rule databases.

7. The system according to claim 1, wherein the interface device is a virtual interface device, and the processing device is a data processing and dispatching device.

8. A method of accessing and transmitting different data frames in a digital transmission network through the system of claim 1, comprising the following steps:

determining whether data frames entering the virtual private device via the inter-device interface are control messages;

if yes, sending the data frames to an external control system via the control interface unit and ending the process; if not, extracting an input data type number and searching in the rule database according to the input data type number;

determining whether the input data type number is found;

if not, discarding the data frames and ending the process;

if yes, processing the data frames according to a rule type;

modifying the data frames, sending the data frames through the inter-device interface, and ending the process.

9. The method according to claim 8, wherein the step of processing the data frames according to a rule type comprises the following steps:

determining the rule type, if it is a convergence rule, inserting a label number defined in the rule in a special position of the data frames;

if it is a divergence rule, removing a label number in a special position of the data frames;

if it is a relay rule, changing a label number in a special position of the data frames into a label number defined in the rule.

10. The method according to claim 9, wherein the step of modifying the data frames comprises the step of replacing a data frame type number in the head position of the data frames with an output data frame type number defined in the rule.

11. The system according to claim 4, wherein the rule type is one of convergence, divergence and relay rules.

* * * * *